(12) United States Patent
Takasawa et al.

(10) Patent No.: US 8,344,096 B2
(45) Date of Patent: Jan. 1, 2013

(54) PHOSPHORUS-CONTAINING POLYCARBONATE POLYOL, METHOD FOR PRODUCTION THEREOF, AND PHOSPHORUS-CONTAINING POLYCARBONATE POLYURETHANE

(75) Inventors: Ryoichi Takasawa, Ube (JP); Kosuke Fujiyama, Ube (JP); Masahiro Naiki, Ube (JP); Masahiko Watanabe, Ube (JP); Yasuhiro Kawachi, Ube (JP)

(73) Assignee: Ube Industries, Ltd., Ube-shi (JP)

( * ) Notice: Subject to any disclaimer, the term of this patent is extended or adjusted under 35 U.S.C. 154(b) by 106 days.

(21) Appl. No.: 12/667,607

(22) PCT Filed: Jul. 4, 2008

(86) PCT No.: PCT/JP2008/062191
§ 371 (c)(1),
(2), (4) Date: Feb. 1, 2010

(87) PCT Pub. No.: WO2009/005147
PCT Pub. Date: Jan. 8, 2009

(65) Prior Publication Data
US 2010/0197887 A1 Aug. 5, 2010

(30) Foreign Application Priority Data
Jul. 4, 2007 (JP) ................. 2007-176514

(51) Int. Cl.
*C08G 79/04* (2006.01)
(52) U.S. Cl. .......................................... 528/398
(58) Field of Classification Search .................. None
See application file for complete search history.

(56) References Cited

U.S. PATENT DOCUMENTS

| | | | |
|---|---|---|---|
| 4,307,221 A | 12/1981 | Poisson et al. | |
| 4,444,978 A * | 4/1984 | Dick et al. | 528/167 |
| 6,569,531 B1 | 5/2003 | Takase et al. | |
| 7,105,227 B2 * | 9/2006 | Yasuda et al. | 428/365 |
| 2005/0101205 A1 * | 5/2005 | Yasuda et al. | 442/59 |
| 2005/0107556 A1 * | 5/2005 | Tamura et al. | 526/319 |

FOREIGN PATENT DOCUMENTS
JP 55-129419 A 10/1980
(Continued)

OTHER PUBLICATIONS

Polyurethanes, 2000(C), p. 1-4.*

(Continued)

*Primary Examiner* — Randy Gulakowski
*Assistant Examiner* — Jeffrey Washville
(74) *Attorney, Agent, or Firm* — Knobbe Martens Olson & Bear LLP

(57) ABSTRACT

The phosphorus-containing polycarbonate polyol disclosed herein has a structural unit (I) represented by a formula: —OCOO— and a structural unit (II) represented by a residue A, wherein A denotes a n-valent residue in which n of alcoholic hydroxyl groups are removed from a phosphorus compound having at least n of alcoholic hydroxyl groups, in which n is an integer of 2 or larger, and wherein a terminal group of the polyol is a alcoholic hydroxyl group. The novel phosphorus-containing polycarbonate polyol, as a reactive flame-retardant agent, can provide flame-retardant properties easily to polyurethane or the like.

11 Claims, 1 Drawing Sheet

FOREIGN PATENT DOCUMENTS

| | | |
|---|---|---|
| JP | 60-58433 | 4/1985 |
| JP | 62-230821 A | 10/1987 |
| JP | 08-157584 A | 6/1996 |
| JP | 11-156915 | 6/1999 |
| JP | 2003-206350 A | 7/2003 |
| JP | 2007-39537 A | 2/2007 |

OTHER PUBLICATIONS

International Search Report corresponding to PCT Application No. PCT/JP2008/062191, mailed Sep. 9, 2008.
International Preliminary Report on Patentability corresponding to PCT Application No. PCT/JP2008/062191, mailed Jan. 26, 2010.

* cited by examiner

US 8,344,096 B2

PHOSPHORUS-CONTAINING POLYCARBONATE POLYOL, METHOD FOR PRODUCTION THEREOF, AND PHOSPHORUS-CONTAINING POLYCARBONATE POLYURETHANE

This application is the U.S. National Phase under 35 U.S.C. §371 of International Application PCT/JP2008/062191, filed Jul. 4, 2008 designating the U.S., and published in Japanese as WO 2009/005147 on Jan. 8, 2009, which claims priority to Japanese Patent Application No. 2007-176514 filed Jul. 4, 2007.

TECHNICAL FIELD

The present invention relates to phosphorus-containing polycarbonate polyol useful as a reactive flame-retardant agent and the method for producing it. The present invention also relates to phosphorus-containing polycarbonate polyurethane obtained by using polycarbonate polyol.

BACKGROUND ART

In recent years, flame retardancy of resin materials has become more important because the use of materials is expanding to various applications and to the uses in more densified conditions. Patent Documents 1 discloses the flame-retardant polyester copolymer comprising bifunctional alkylphosphine oxide as a copolymerization component. Patent Documents 2 also discloses the phosphorus-containing polycarbonate characterized by comprising a certain structural unit comprising phosphorus. Since the terminal group of this phosphorus-containing polycarbonate is phenolic hydroxyl group, its usage as a reactive flame-retardant agent has been limited due to low reactivity.

Patent document 1: JP-A-H8-157,584
Patent document 2: JP-A-2003-206,350

DISCLOSURE OF THE INVENTION

Problems to be Solved by the Invention

The objective of the present invention is to provide novel phosphorus-containing polycarbonate polyol as a reactive flame-retardant agent, which is capable of giving flame-retardancy easily to polyurethane, polyester, polyamide, polyimide or other resins. The objective of the present invention is also to provide phosphorus-containing polycarbonate polyurethane obtained by using this phosphorus-containing polycarbonate polyol.

Means of Solving the Problems

The present invention relates to a phosphorus-containing polycarbonate polyol, comprising:
a structural unit (I) represented by a formula: —OCOO—, and
a structural unit (II) represented by a residue A, wherein A denotes a n-valent residue in which n of alcoholic hydroxyl groups are removed from a phosphorus compound having at least n of alcoholic hydroxyl groups, in which n is an integer of 2 or larger; and
wherein terminal group of the polyol is alcoholic hydroxyl group.

Another aspect of the present invention relates to a phosphorus-containing polycarbonate polyurethane, produced by reacting the phosphorus-containing polycarbonate polyol with a polyisocyanate.

Effect of the Invention

According to the present invention, novel phosphorus-containing polycarbonate polyol can be provided, useful as so-called reactive flame-retardant agent. The phosphorus-containing polycarbonate polyol can react with other components to introduce the flame-retardant component into the target material. This phosphorus-containing polycarbonate polyol also can be used as, in particular, the raw material of the phosphorus-containing polyurethane. Further, it can provide flame-retardant properties easily to polyurethane, polyester, polyamide, polyimide or other resins. It is also useful as an additive such as epoxy curing agent and the chain extender of polyurethane. The phosphorus-containing polycarbonate polyol of the present invention may be used as reactive flame-retardant agents, polymer modifiers, polymer plasticizers, inks, paints, coating materials, adhesives and electronic materials.

BEST MODE FOR CARRYING OUT THE INVENTION

Figure 1:
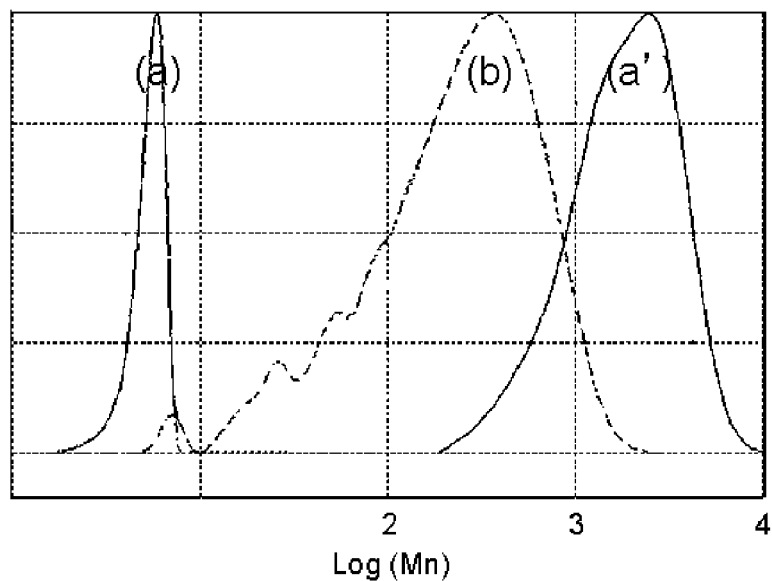
FIG. 1 shows the GPC chart before and after the reaction in the Example 1 of the present invention.

In the explanation hereafter, the "phosphorus compound having at least n of alcoholic hydroxyl groups" may be referred as phosphorus compound A(OH)n for simplicity.

As stated above, the phosphorus-containing polycarbonate polyol of the present invention comprises the structural unit (I) represented by the formula: —OCOO—, i.e., the carbonate structural unit (oxycarbonyloxy group) and the structural unit (II) represented by the residue A.

Here, the residue A denotes the n-valent residue in which n of alcoholic hydroxyl groups are removed from the phosphorus compound having at least n of alcoholic hydroxyl groups (i.e., the phosphorus compound A(OH)n).

The n is an integer of 2 or larger, preferably not more than 6, more preferably 2, 3 or 4. In particular, the residue A wherein n is 2 is preferred, i.e., it is preferable to comprise the $A^1$ described below.

When the residue A wherein n is 2 is comprised, the phosphorus-containing polycarbonate polyol of the present invention comprises the structural unit represented by the general formula (1):

Here, $A^1$ denotes a divalent residue in which two alcoholic hydroxyl groups are removed from the phosphorus compound having at least two alcoholic hydroxyl groups.

In addition, when a polymer chain comprises the residue A wherein n is 3 or more, branch(es) is contained in the polymer chain and a bridged structure develops as represented by, for example, the formula below.

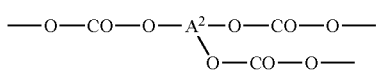

Here, $A^2$ denotes a trivalent residue in which three alcoholic hydroxyl groups are removed from the phosphorus compound having at least three alcoholic hydroxyl groups.

When A exists in a polymer chain, A is bonded to n of the structural units (I); and in addition, when A exists at the terminal of polymer, it is bonded to at least one OH and at least one structural unit (I) and forms the terminal alcoholic hydroxyl group.

The residues A contained in the phosphorus-containing polycarbonate polyol may be same or different. When they are different, the polyol may comprises the residues A with different n or the residues A with different structure even if the n is same.

In addition, when the phosphorus compound A(OH)n has just n of alcoholic hydroxyl groups, the residue A itself comprises no alcoholic hydroxyl group. When the phosphorus compound A(OH)n has the alcoholic hydroxyl groups more than n, the residue A itself comprises the alcoholic hydroxyl groups not less than 1. Generally, it is preferred that the phosphorus compound A(OH)n has just n of alcoholic hydroxyl groups.

The phosphorus-containing polycarbonate polyol of the present invention may optionally comprise the residue B derived from the polyol component. The residue B is the residue that is bonded to the structural unit —OCOO— and contained in the polymer in general and conventional polycarbonates, for example, the residue in which the OH groups are removed from the polyol used to produce general and conventional polycarbonates. It is usually a divalent residue and may comprise a residue with a valence not less than 3 for a bridged structure. When the residue B is divalent, the phosphorus-containing polycarbonate polyol of the present invention comprises the structural unit:

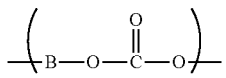

Specifically, the residue B is the residue that is introduced into the phosphorus-containing polycarbonate polyol of the present invention together with the residue A by the "First Method" or "Second Method" described below.

The terminal group of the phosphorus-containing polycarbonate polyol of the present invention is the alcoholic hydroxyl group. Here, the alcoholic hydroxyl group means that the carbon to that the hydroxyl group is directly bonded is aliphatic carbon, i.e., the hydroxyl group is not directly bonded to the carbon constituting an aromatic ring member such as benzene ring. For example, the alcoholic hydroxyl group refers to those bonded to the carbon of aliphatic hydrocarbon group or alicyclic hydrocarbon group. The aliphatic hydrocarbon group or alicyclic hydrocarbon group may comprise aromatic group as another structural constituent than carbon to that the hydroxyl group is bonded, and a part of the aliphatic hydrocarbon group or alicyclic hydrocarbon group may be substituted with oxygen, sulfur or nitrogen.

More preferably, the alcoholic hydroxyl group is the hydroxyl group that can be represented by the chemical formula described below:

—CX$_2$—OH  General Formula (2), wherein X is each independently hydrogen atom or monovalent hydrocarbon group having 1 to 18 carbon atoms.

The terminal alcoholic hydroxyl group of the phosphorus-containing polycarbonate polyol is the OH group bonded to the residue A, or the OH group bonded to the residue B derived from the polyol component when it coexists.

Therefore, the phosphorus-containing polycarbonate polyol of the present invention comprises, and preferably consists substantially only of, the structural unit (I), the structural unit (II) represented by the residue A and the residue B as an optional structural unit. Hence, the terminal group has and preferably consists substantially only of -AOH (i.e., the alcoholic hydroxyl group bonded to the residue A) and —BOH (i.e., the alcoholic hydroxyl group bonded to the residue B) when the residue B exists. Therefore, when both the residue A and residue B are divalent, the preferred phosphorus-containing polycarbonate polyol of the present invention has the alternately-repeated structure of the residue A or residue B and the structural unit (I), and its terminal group is -AOH or —BOH.

The inclusion of the residue A improves the flame retardance of the phosphorus-containing polycarbonate polyol. Therefore, the ratio of (the residue A)/(the residue B) is more than 0/1 and preferably not less than 0.1/1. The ratio of the residue A/the residue B may be 1/0, i.e., the residue B may not exist.

The phosphorus compound A(OH)n is not particularly limited as long as it is the phosphorus compound comprising phosphorus atom and having the alcoholic hydroxyl groups of two or more. The compound having two alcoholic hydroxyl groups includes, for example, the phosphine compound represented by the general formula (3) described below or the aminophosphonate represented by the general formula (4), phosphorus-based polyol compound represented by the general formula (5) and the like. For all of these products, commercially available ones may be used. Among (3) to (5), the phosphine compound represented by the general formula (3) is preferably used in view of availability, handling, reactivity and the like.

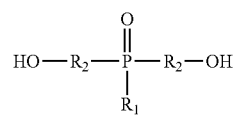

(3)

In the formula (3), $R_1$ denotes monovalent hydrocarbon group having 1 to 20 carbon atoms (preferably monovalent aliphatic hydrocarbon group having 1 to 18 carbon atoms, particularly 1 to 6 carbon atoms, or monovalent hydrocarbon group comprising aromatic ring having 6 to 20 carbon atoms); and $R_2$ is a group bonded to the alcoholic hydroxyl group and denotes each independently divalent hydrocarbon group having 1 to 20 carbon atoms (preferably divalent aliphatic hydrocarbon group having 1 to 18 carbon atoms, particularly 1 to 6 carbon atoms, or divalent hydrocarbon group comprising aromatic ring having 6 to 20 carbon atoms), in which both of the hydrocarbon groups may have cyclic structure in their structures or may have heteroatom such as N, S, O and the like.

The preferred example of the phosphine compound represented by the general formula (3) described above includes n-butyl-bis(3-hydroxypropyl)phosphine oxide, n-propyl-bis (3-hydroxypropyl)phosphine oxide, ethyl-bis(3-hydroxypropyl)phosphine oxide, methyl-bis(3-hydroxypropyl)phosphine oxide, phenyl-bis(3-hydroxypropyl)phosphine oxide, ethyl-bis(2-hydroxyethyl)phosphine oxide, methyl-bis(2-hydroxyethyl)phosphine oxide, phenyl-bis(2-hydroxyethyl) phosphine oxide, methyl-bis(hydroxymethyl)phosphine oxide, phenyl-bis(hydroxymethyl)phosphine oxide.

Due to commercial availability as PO-4500 made by Nippon Chemical Industrial Co., Ltd, n-butyl-bis(3-hydroxypropyl)phosphine oxide is preferred.

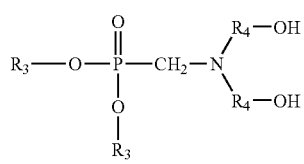

(4)

In the formula (4), individual $R_3$ denotes each independently monovalent hydrocarbon having 1 to 20 carbon atoms (preferably monovalent aliphatic hydrocarbon group having 1 to 18 carbon atoms, particularly 1 to 6 carbon atoms, or monovalent hydrocarbon group comprising aromatic ring having 6 to 20 carbon atoms), and these groups may have ether bond or ester bond, and may also comprise hydroxyl group. Individual $R_4$ denotes each independently divalent hydrocarbon group having 1 to 20 carbon atoms (preferably divalent aliphatic hydrocarbon group having 1 to 18 carbon atoms, particularly 1 to 6 carbon atoms, or divalent hydrocarbon group comprising aromatic ring having 6 to 20 carbon atoms), and these groups may have ether bond or ester bond, and may also comprise hydroxyl group.

The specific example of the aminophosphonate polyol represented by the general formula (4) described above includes diisopropyl-N,N-bis(2-hydroxyethyl)aminomethyl phosphonate, diisobutyl-N,N-bis(2-hydroxyethyl)aminomethyl phosphonate, dioctyl-N,N-bis(2-hydroxyethyl)aminomethyl phosphonate, dioctadecyl-N,N-bis(2-hydroxyethyl)aminomethyl phosphonate, diethyl-N,N-bis(2-hydroxyethyl) aminomethyl phosphonate, diethyl-N,N-bis(2-hydroxypropyl)aminomethyl phosphonate and the like. Among them, the preferred example includes diethyl-N,N-bis(2-hydroxyethyl) aminomethyl phosphonate available commercially under the "AdekaPolyol FC-450" from Adeka Corporation.

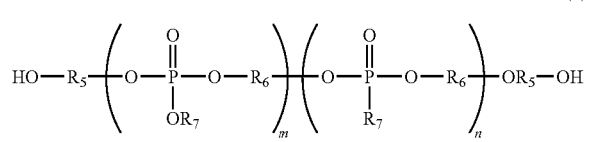

(5)

In the formula (5), individual $R_5$ and $R_6$ denote each independently divalent hydrocarbon group having 1 to 20 carbon atoms (preferably divalent aliphatic hydrocarbon group having 1 to 18 carbon atoms, particularly 1 to 6 carbon atoms, or divalent hydrocarbon group comprising aromatic ring having 6 to 20 carbon atoms), individual $R_7$ denote each independently monovalent aliphatic hydrocarbon group having 1 to 18 carbon atoms, particularly 1 to 6 carbon atoms, or monovalent hydrocarbon group comprising aromatic ring having 6 to 20 carbon atoms, and both of the hydrocarbon groups may have cyclic structure in their structures or may have heteroatom such as N, S, O and the like. m and n are each independently integer from 0 to 1000 with the proviso that at least one of them is 1 or larger.

Its preferred example includes water-soluble hydroxyl group-containing oligomeric phosphorus-based polyol available commercially under the trade name, "EXOLIT OP550" from Clariant, Japan. This substance may be produced from, for example, the reaction product of dimethylmethyl phosphonate, phosphorus pentoxide, ethylene oxide and water in their molar ratio of 2:2:8:1.

The phosphorus compound A(OH)n comprising three, four or more of alcoholic hydroxyl groups also includes, for example, the compound of the formulae (3) to (5) in which the hydrocarbon group to that OH is not bonded has OH group, or the compound of the formulae (3) to (5) in which the hydrocarbon group to that OH is bonded has further OH group.

The phosphorus compound A(OH)n comprising three alcoholic hydroxyl groups includes, for example, the compound of the formula (3) in which $R^1$ has OH group, or one of $R^2$ has further OH group. The compound in which $R^1$ has OH group includes, for example, 4-hydroxybutyl-bis(3-hydroxypropyl)phosphine oxide, tris(3-hydroxypropyl)phosphine oxide, 2-hydroxyethyl-bis(3-hydroxypropyl)phosphine oxide, hydroxymethyl-bis(3-hydroxypropyl)phosphine oxide, tris(2-hydroxyethyl)phosphine oxide, hydroxymethyl-bis(2-hydroxyethyl)phosphine oxide, tris(hydroxymethyl)phosphine oxide and the like.

The method for preparing the phosphorus-containing polycarbonate polyol of the present invention will be explained hereafter.

[First Method]

The polycarbonate polyol and the phosphorus compound A(OH)n (particularly preferably n=2, the same throughout the explanation below in this method) are subjected to transesterification reaction. In this reaction, divalent alcohol compound may be further added to the reaction as necessary.

The polycarbonate polyol used in the present invention is preferably the polycarbonate diol represented by formula (6). In the formula (6), R denotes alkylene group having 2 to 25 (preferably 2 to 15) carbon atoms, and k denotes integer from 1 to 150. As this polycarbonate diol, products made by any known methods may be used. The products that may be used are those, for example, made by the transesterification reaction of divalent alcohol (HO—R—OH) having alkylene group having 4 to 25 (preferably 4 to 15) carbon atoms corresponding to R of the formula (6) with carbonate compound, the ring-opening polymerization of cyclic carbonate having alkylene group having 2 to 25 (preferably 2 to 15) carbon atoms, or the reaction of the aliphatic divalent alcohol with chloroformate ester or phosgene. Among these, preference is given to the polycarbonate diol produced by the transesterification reaction of the divalent alcohol having alkylene group having 4 to 25 (preferably 4 to 15) carbon atoms with carbonate compound. The carbonate compound includes aliphatic or aromatic carbonate (carbonate ester) such as dialkyl carbonate, diaryl carbonate, alkylene carbonate and alkylaryl carbonate. Specific examples include dimethyl carbonate, diethyl carbonate, di-n-butyl carbonate, diisobutyl carbonate, diphenyl carbonate, methylphenyl carbonate, ethylene carbonate, propylene carbonate and the like. The copolymerized polycarbonate diol may also be used, in which two or more of divalent alcohols having alkylene group are combined.

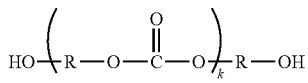
(6)

In the formula (6), k is integer from 1 to 150.

For this polycarbonate polyol, the commercially available product may be used. The preferred example of this polycarbonate polyol includes ETERNACOLL (registered trademark) series made by Ube Industries, Ltd., KurarayPolyol series made by Kuraray Co. Ltd., PLACCEL (registered trademark) series made by Daicel Chemical Industries, Ltd. and the like. These polycarbonate polyol may be used alone or in the combination of two or more of them. In addition, the number average molecular weight of these polycarbonate polyols is preferably not less than 500, more preferably 2,000 to 20,000. Use of the polycarbonate polyol having lower number-average molecular weight leads to the decrease in the molecular weight of the produced phosphorus-containing polycarbonate polyol. On the other hand, use of the polycarbonate polyol having higher number-average molecular weight leads to higher viscosity and therefore difficulty in handling.

The phosphorus compound A(OH)n to be reacted preferably includes the above-mentioned (3) to (5).

The first method may be conducted in a batch or continuous manner, for example, by the method of bringing and reacting a predetermined ratio of the polycarbonate polyol and phosphorus compound A(OH)n, the method of continuously feeding and reacting a predetermined ratio of the polycarbonate polyol and phosphorus compound A(OH)n in molten state, and the like.

The ratio to be provided of the phosphorus compound A(OH)n and polycarbonate polyol for the transesterification reaction is 0.001 to 10 moles, preferably 0.01 to 1 mole, particularly preferably 0.05 to 0.5 moles of the polycarbonate polyol for 1 mole of the phosphorus compound A(OH)n. While the lower feeding ratio of the polycarbonate polyol leads to the decrease in the molecular weight of the produced phosphorus-containing polycarbonate polyol, the higher feeding ratio leads to the decrease in the phosphorus content in the phosphorus-containing polycarbonate polyol.

Preferred reaction temperature is 50 to 300° C., preferably 50 to 250° C., more preferably 100 to 180° C. While the reaction pressure is not particularly restricted, the reaction is performed, for example, under ordinary pressure. The reaction atmosphere is usually an inert gas atmosphere such as nitrogen, argon and helium.

In the first method, a transesterification catalyst may be preferably employed as necessary. When the polycarbonate polyol was obtained by reacting the carbonate compound with the corresponding diol and the transesterification catalyst remains with retaining its activity, the reaction may be performed without adding the transesterification catalyst. Otherwise, the reaction is preferably conducted by newly adding the transesterification catalyst. The amount of the transesterification catalyst to be used is preferably 1 to 5,000 ppm, more preferably 10 to 1,000 ppm by weight based on the total amount of materials provided.

The transesterification catalyst is not particularly limited as long as it is a compound catalyzing the transesterification reaction. It preferably includes, for example, titanium compound such as titanium tetrachloride and tetraalkoxy titanium (such as tetra-n-butoxy titanium and tetraisopropoxy titanium); and tin compound such as metal tin, tin hydroxide, tin chloride, dibutyltin laurate, dibutyltin oxide and butyltin tris (ethylhexanoate). Among these, tetraalkoxy titanium (such as tetra-n-butoxy titanium and tetraisopropoxy titanium), dibutyltin laurate, dibutyltin oxide and butyltin tris(ethylhexanoate) are preferred, and tetraalkoxy titanium (such as tetra-n-butoxy titanium and tetraisopropoxy titanium) is particularly preferred.

The phosphorus-containing polycarbonate polyol produced by the first method contains, as the residue B, the divalent residue derived from the polycarbonate polyol used as the raw material of the reaction, for example, the group —R— when the polycarbonate diol of the formula (6) is used. When the divalent alcohol compound is added to the reaction, the phosphorus-containing polycarbonate polyol further comprises the residue in which two OH are removed from this alcohol compound.

[Second Method]

The phosphorus compound A(OH)n (particularly preferably n=2, the same throughout the explanation below in this method) is reacted with the carbonate compound or phosgene. In this reaction, divalent alcohol compound may be further added to the reaction as necessary.

It is preferred that the feeding ratio of the carbonate compound or phosgene is 0.5 to 1 mole against 1 mole of the polyol component (the total of the phosphorus compound A(OH)n and the divalent alcohol added optionally).

The carbonate compound used in the present invention includes aliphatic or aromatic carbonate (i.e. carbonate ester) such as dialkyl carbonate, diaryl carbonate, alkylene carbonate and alkylaryl carbonate. Specific examples include dimethyl carbonate, diethyl carbonate, di-n-butyl carbonate, diisobutyl carbonate, diphenyl carbonate, methylphenyl carbonate, ethylene carbonate, propylene carbonate and the like.

This reaction is a transesterification reaction, which may be performed in accordance with the method of the transesterification reaction to produce the known polycarbonate polyols. That is to say, the phosphorus-containing polycarbonate polyol of the present invention may be preferably prepared by the transesterification reaction while continuously extracting the by-product of aliphatic or aromatic compound having hydroxyl group from the reaction system, if necessary, in the presence of the transesterification catalyst as necessary.

The transesterification catalyst is not particularly limited as long as it is a compound catalyzing the transesterification reaction. It preferably includes, for example, titanium compound such as titanium tetrachloride and tetraalkoxy titanium (such as tetra-n-butoxy titanium and tetraisopropoxy titanium); and tin compound such as metal tin, tin hydroxide, tin chloride, dibutyltin laurate, dibutyltin oxide and butyltin tris (ethylhexanoate). Among these, tetraalkoxy titanium (such as tetra-n-butoxy titanium and tetraisopropoxy titanium), dibutyltin laurate, dibutyltin oxide and butyltin tris(ethylhexanoate) are preferred, and tetraalkoxy titanium (such as tetra-n-butoxy titanium and tetraisopropoxy titanium) is particularly preferred. The amount of the transesterification catalyst to be used is preferably 1 to 5,000 ppm, more preferably 10 to 1,000 ppm by weight based on the amount of polyether diol.

Although the condition of the transesterification reaction is not particularly limited as long as the target product can be produced; it is preferred that for effectively producing the target product, the reaction is performed for about 1 to 24 hours at 80 to 250° C. (in particular, 110 to 200° C.) under ordinary pressure, and then for about 0.1 to 20 hours at 80 to 250° C. (in particular, 110 to 240° C.) under reduced pressure, and further the degree of vacuum is gradually increased at the same temperature and finally the reaction is conducted for about 0.1 to 20 hours under reduced pressure not higher than 20 mmHg. It is also preferred that a reactor is equipped with a distillation column to extract the by-product phenol and by-product alcohol, and further the reaction may be conducted in flow of inert gas (such as nitrogen, helium and argon).

When the divalent alcohol compound is added to the reaction in the second method, the resultant phosphorus-containing polycarbonate polyol contains, as the residue B, the residue in which two OH are removed from this alcohol compound. When no divalent alcohol compound is added to the reaction, the phosphorus-containing polycarbonate polyol does not contain the residue B, and contains the structural unit (I) of the carbonate structural unit and the phosphorus-containing structural unit (II) represented by the residue A.

The second method has an advantage in that the content of the structural unit (II) represented by the residue A can be relatively freely controlled from its lower proportion to higher proportion, and as a result, the products with lower content of phosphorus to the products with higher content of phosphorus can be produced.

As explained in the "first method" and "second method," the addition of the divalent alcohol compound to the reaction as necessary allows the residue derived from this divalent alcohol compound to be introduced into the phosphorus-containing polycarbonate polyol of the present invention as the residue B.

The divalent alcohol compound includes compounds wherein alkylene group is trimethylene group such as 2-methyl-1,3-propanediol, 1,3-butanediol, 2,4-heptanediol, 2,2-diethyl-1,3-propanediol, 2-methyl-2-propyl-1,3-propanediol, 2-ethyl-1,3-hexanediol, 2-methyl-2,4-pentanediol, 2,2,4-trimethyl-1,3-pentanediol and 2-butyl-2-ethyl-1,3-propanediol; compounds wherein alkylene group is tetramethylene group such as 1,4-butanediol; compounds wherein alkylene group is pentamethylene group such as 1,5-pentanediol, 3-methyl-1,5-pentanediol and 1,5-hexandiol; compounds wherein alkylene group is hexamethylene group such as 1,6-hexanediol and 2-ethyl-1,6-hexanediol; compounds wherein alkylene group is heptamethylene group such as 1,7-heptandiol; compounds wherein alkylene group is octamethylene group such as 1,8-octanediol and 2-methyl-1,8-octanediol; compounds having long-chain alkylene group such as 1,9-nonanediol, 1,10-decanediol, 1,11-undecanediol, 1,12-dodecanediol and 1,20-eicosanediol; compounds wherein substituent group of alkylene group or a part of alkylene group is forming ring (alicyclic and aromatic ring) such as 1,3-cyclohexanediol, 1,4-cyclohexane diol, cyclohexane-1,4-dimethanol, cyclohexane-1,4-diethanol, 2,2-bis(4-hydroxycyclohexyl)propane, 2,7-norbornanediol and 1,4-benzenedimethanol; compounds wherein a part of carbon atoms in alkylene group is replaced by oxygen, sulfur or nitrogen atom such as diethylene glycol, triethylene glycol, polyethylene glycol, dipropylene glycol, polypropylene glycol and polytetramethylene glycol; compounds wherein a part of carbon atoms in alkylene group is replaced by oxygen, sulfur or nitrogen atom and at the same time substituent group of alkylene group or a part of alkylene group is forming ring (alicyclic and aromatic ring) such as 2,5-tetrahydrofuran dimethanol and 1,4-bis(hydroxyethoxy)cyclohexane; and the like.

Preference is given to the phosphorus-containing polycarbonate polyol of the present invention having number average molecular weight of about 500 to 10,000, preferably about 500 to 5,000, more preferably about 500 to 3,000. For this reason, it is preferred that the molecular weight is adjusted by the known method when the hydroxyl group index (i.e. molecular weight) of the reaction product is out of the targeted range, that is, in case its molecular weight is low, further reaction is carried out while distilling diol under reduced pressure, and in case its molecular weight is high, diol is further added and further transesterification reaction is carried out. It is also preferred to inactivate the residual transesterification catalyst with water or phosphorus-based compound (such as phosphoric acid, butyl phosphate and dibutyl phosphate) after adjusting the molecular weight as necessary.

Next, the phosphorus-containing polycarbonate polyurethane using the phosphorus-containing polycarbonate polyol of the present invention will be explained.

The phosphorus-containing polycarbonate polyurethane of the present invention is obtained by reacting the phosphorus-containing polycarbonate polyol having terminal alcoholic hydroxyl group of the present invention with polyisocyanate.

The polyisocyanate used herein may be a polyisocyanate usually used to produce polyurethane, and specifically the compound in which isocyanate group is bonded to the free terminal of polyvalent (at least divalent) hydrocarbon group. This hydrocarbon group may be aliphatic (including alicyclic) hydrocarbon group (preferably having 2 to 14 carbon atoms) or aromatic (including aromatic-aliphatic) hydrocarbon group (preferably having 6 to 14 carbon atoms), may also have substituent (alkyl group, nitro group) uninvolved in the reaction, and may also contain heteroatom (oxygen atom, sulfur atom, nitrogen atom) in the carbon chain.

The polyisocyanate includes various aliphatic or aromatic polyisocyanate. Specifically, the aliphatic polyisocyanate includes, for example, alkane polyisocyanate such as 1,3-trimethylene diisocyanate, 1,4-tetramethylene diisocyanate, 1,6-hexamethylene diisocyanate, 2,2,4-trimethyl-1,6-hexamethylene diisocyanate, 2,4,4-trimethyl-1,6-hexamethylene diisocyanate, 1,9-nonamethylene diisocyanate and 1,10-decamethylene diisocyanate, cycloalkane polyisocyanate such as 1,4-cyclohexane diisocyanate, 4,4'-dicyclohexylmethane diisocyanate, hydrogenated-xylylene diisocyanate and 1,3,5-tris(isocyanomethyl)cyclohexane, alkane polyisocyanate having heteroatom such as 2,2'-diethylether diisocyanate, 2,2'-diethylsulfide diisocyanate, hexamethylene diisocyanate-biuret type, 2-isocyanoethylthio-1,3-isocyanopropane, 1,1-bis(isocyanomethylthio)-4-isocyanobutane, 3,3-bis(isocyanoethylthio)-1-isocyanobutane and 2,3-bis(isocyanoethylthio)-1-isocyanomethylthiopropane, and cycloalkane polyisocyanate having heteroatom such as isophorone diisocyanate, 1,4-dithiane-2,5-diisocyanate, 2,3-bis(isocyanomethyl)-1,4-dithiane, 2,5-bis(isocyanomethyl)-1,4-dithiane, 2,5-bis(isocyanoethyl)-1,4-dithiane, cyclopentane-1,3-disulfide-4,5-diisocyanate, 4,5-bis(isocyanomethyl)cyclopentane-1,3-disulfide, 2-methyl-4,5-bis(isocyanomethyl)cyclopentane-1,3-disulfide, 2,2-bis(isocyanopropyl)cyclopentane-1,3-disulfide, tetrahydrothiophene-2,5-diisocyanate, 2,5-bis(isocyanomethyl)tetrahydrothiophene and 3,4-bis(isocyanomethyl)tetrahydrothiophene.

Specifically, the aromatic polyisocyanate includes, for example, p-phenylene diisocyanate, 4,4'-diphenyl diisocyanate, 1,5-naphthalene diisocyanate, tolylene diisocyanate (TDI), xylylene diisocyanate (XDI), 4,4'-diphenylmethane diisocyanate (MDI), 3,3'-methyleneditolylene-4,4'-diisocyanate, tolylene diisocyanate trimethylolpropane adduct, 4,4'- diphenyl ether diisocyanate, tetrachlorophenylene diisocyanate, 3,3'-dichloro-4,4'-diphenylmethane diisocyanate, triphenylmethane triisocyanate, 1,3,5-tris(isocyanomethyl) benzene, triisocyanate phenylthio phosphate and the like.

One or two or more of chain extenders may be used for the polyurethane forming reaction to react the phosphorus-containing polycarbonate polyol having terminal alcoholic hydroxyl group with polyisocyanate. Such chain extender includes those usually used for producing polyurethane, and those include low-molecular compound having at least two hydrogen atoms capable of reacting with isocyanate group, specifically, polyol compound, polythiol compound, polyamine compound and the like.

The polyol compound serving as the chain extender includes, for example, aliphatic polyol such as ethylene glycol, 1,2-propylene glycol, 1,3-propanediol, 1,3-butanediol, 1,4-butanediol, 1,5-pentanediol, 1,6-hexandiol, 1,8-octanediol, 1,9-nonanediol, 1,10-decanediol, 1,12-dodecanediol, neopentyl glycol, 3-methyl-1,5-pentanediol, 3,3-dimethylolheptane, 1,4-cyclohexanediol, 1,4-cyclohexane dimethanol, 1,4-bis(hydroxyethyl)cyclohexane, 2-hydroxyethyl ether, 2-hydroxyethyl sulfide, 2,5-bis(hydroxymethyl-1,4-dioxane, 2,5-bis(hydroxymethyl)-1,4-dithiane, trimethylolethane, trimethylolpropane and pentaerythritol, aromatic polyol such as catechol, resorcinol, hydroquinone, 1,3,5-benzenetriol, 1,2-bis(hydroxymethyl)benzene, 1,3-bis(hydroxymethyl)benzene, 1,4-bis(hydroxymethyl)benzene and 1,3,5-tris(hydroxymethyl)benzene, 2,2-bis(hydroxymethyl)propionic acid and 2,2-bis(hydroxymethyl)butanoic acid. As the chain extender, the polyol having carboxylic group, 2,2-bis(hydroxymethyl)propionic acid and 2,2-bis(hydroxymethyl)butanoic acid are particularly preferred because, if they are used, the products can be dissolved or dispersed in water or polar solvent.

The polythiol compound serving as the chain extender includes, for example, aliphatic polythiol such as 1,2-ethanedithiol, 1,2-propanedithiol, 1,3-propanedithiol, 1,4-butanedithiol, 1,5-pentanedithiol, 1,6-hexanedithiol, 1,7-heptanedithiol, 1,8-octanedithiol, 1,9-nonanedithiol, 1,10-decanedithiol, 1,12-dodecanedithiol, 2,2-dimethyl-1,3-propanedithiol, 3-methyl-1,5-pentanedithiol, 2-methyl-1,8-octanedithiol, 1,4-cyclohexanedithiol, 1,4-bis(mercaptomethyl)cyclohexane, 2-mercaptoethyl ether, 2-mercaptoethylsulfide, 2-mercaptoethyldisulfide, 2,5-bis(mercaptomethyl)-1,4-dioxane, 2,5-bis(mercaptomethyl)-1,4-dithiane, 1,1,1-tris(mercaptomethyl)ethane, 2-ethyl-2-mercaptomethyl-1,3-propanedithiol, tetrakis(mercaptomethyl)methane, 3,3'-thiobis(propane-1,2-dithiol), 2,2'-thiobis(propane-1,3-dithiol), pentaerythritol tetrakis(mercaptopropionate), pentaerythritol tetrakis(mercaptoacetate), aromatic polythiol such as 1,2-benzenedithiol, 1,3-benzenedithiol, 1,4-benzenedithiol, 1,3,5-benzenetrithiol, 1,2-bis(mercaptomethyl)benzene, 1,3-bis(mercaptomethyl)benzene, 1,4-bis(mercaptomethyl)benzene, 1,3,5-tris(mercaptomethyl)benzene, toluene-3,4-dithiol.

The polyamine compound serving as the chain extender includes, for example, aliphatic polyamine such as ethylene diamine, 1,2-propylene diamine, 1,6-hexamethylene diamine, isophorone diamine, bis(4-aminocyclohexyl)methane and piperazine; and aromatic polyamine such as meta- (or para-) xylene diamine.

The chain extender further includes aliphatic or aromatic aminoalcohol such as 2-ethanolamine, N-methyldiethanolamine and N-phenyldipropanolamine; hydroxyalkylsulfamide such as hydroxyethylsulfamide and hydroxyethylaminoethylsulfamide; mercaptoalcohol such as 2-mercaptoethanol, 1,2-dihydroxy-3-mercaptopropane, 2,3-dimercapto-1-propanol, 4-mercaptophenol; aminothiol such as aminoethylmercaptan, 2-aminothiophenol, 3-aminothiophenol and 4-aminothiophenol; urea, water and the like.

The polyurethane forming reaction may be conducted in the absence of solvent or in the presence of solvent inert to isocyanate group. The polyurethane forming reaction in the absence of solvent may be carried out by the following methods (i) to (iii). (i) The phosphorus-containing polycarbonate polyol, the chain extender as necessary and the polyisocyanate compound are mixed and the whole amount is reacted at a single step. (ii) The phosphorus-containing polycarbonate polyol is reacted with the polyisocyanate to obtain the prepolymer having isocyanate group, and then the chain extender is mixed and reacted. (iii) A part of the polyisocyanate is mixed and reacted with the phosphorus-containing polycarbonate polyol (the chain extender is mixed as necessary) to obtain the prepolymer, and then the residual polyisocyanate is further mixed and reacted.

It is preferred that the reaction temperature is 60 to 150° C. in the case of absence of solvent. Here, since the low-molecular-weight prepolymer is obtained if the route via prepolymer is adopted, it is heated to obtain the high-molecular-weight polymer.

The polyurethane forming reaction in the presence of solvent may be carried out by the following methods (i) to (iii). (i) The phosphorus-containing polycarbonate polyol is dissolved in the solvent (the chain extender is mixed as necessary), and then the polyisocyanate is mixed with this and the whole amount is reacted at a single step. (ii) The phosphorus-containing polycarbonate polyol is dissolved in the solvent and the polyisocyanate compound are mixed and reacted to obtain the prepolymer having isocyanate group, and then the chain extender is mixed and reacted. (iii) The phosphorus-containing polycarbonate polyol is dissolved in the solvent (the chain extender is optionally mixed) and a part of the polyisocyanate is mixed and reacted, and then the residual polyisocyanate is further mixed and reacted.

It is preferred that the reaction temperature is 20 to 150° C. in the case of presence of solvent. As the solvent, hence, methyl ethyl ketone, ethyl acetate, toluene, dioxane, dimethylformamide, dimethylacetamide, dimethylsulfoxide, diglyme, triglyme, γ-butyrolactone and the like are representatives.

The proportion of the phosphorus-containing polycarbonate polyol and the chain extender used in the polyurethane forming reaction is preferably that the latter is used within the range of 0 to 10 moles against 1 mole of the former. The usage amount of these is arbitrarily determined by the properties of the targeted polyurethane. It is also preferred that the amount of the polyisocyanate used is determined such that the molar ratio of (the total amount of active hydrogen contained in the phosphorus-containing polycarbonate polyol and the chain extender):(the total amount of isocyanate group) is 1:0.1 to 1:2, more preferably 1:0.5 to 1:1.5. Hence, the known amine-based or tin-based catalyst used in the usual polyurethane forming reaction may be used to promote the reaction in the polyurethane forming reaction.

The resultant phosphorus-containing polycarbonate urethane of the present invention has number average molecular weight of 500 to 500,000. In addition, the phosphorus content in the phosphorus-containing polycarbonate polyurethane is not less than 0.5% by weight, preferably 1 to 15% by weight. Further, its oxygen index is not less than 22, which can be advantageously used as a flame-retardant material.

EXAMPLES

Hereafter, the present invention is further explained by the examples and comparative examples. However, the present invention is not restricted by the following examples.

In each example below, the measurement and evaluation were carried out by the following methods.

[Solution Viscosity]

The measurement was conducted by using the viscometer TV-20 made by Toki Sangyo Co., Ltd at a temperature of 25° C. and revolutions of 10 rpm.

[Hydroxyl Group Index]

The analysis was performed in conformity with JIS-K-1557 and the calculation was conducted by the following equation. In the equation, S (g) denotes the collected amount of a sample, A (ml) denotes the amount of 0.5 N sodium hydroxide solution required to titrate a sample, B (ml) denotes the amount of 0.5 N sodium hydroxide solution required for a blank test, f denotes the factor of 0.5 N sodium hydroxide solution.

$$\text{OH Index(mgKOH/g)} = 28.05(B-A)f/S$$

[GPC]

The measurement was conducted by using LC-10 made by Shimadzu Corporation (GPC column KF-80M×2, KF-802) with THF as solvent to determine number average molecular weight by using the polystyrene standard sample.

[$^1$H-NMR Spectrum]

A $^1$H-NMR spectrum was measured by using a nuclear magnetic spectrometer (AL-300 made by JEOL Ltd.), and a sample was dissolved in deuterated chloroform.

[Tensile Property]

A sheet-shaped sample was cut out in width of 1 cm and length of 7 cm, and used for the test. The measurement was conducted by using a tensile tester (Tensilon UCT-5T made by Orientec Co. Ltd.) under the condition at a temperature of 25° C., humidity of 50% RH, crosshead speed of 50 mm/minute and chuck distance of 5 cm to determine initial modulus, rupture strength and rupture elongation.

[Oxygen Index]

The measurement was performed in conformity with JIS K7201-2. Herein, a sample was fixed on a metal frame with width of 38 mm and height of 120 mm for the measurement because the sheet-shaped sample of the present invention is flexible and not self-supported.

[Evaluation of Burn-Resistance]

After the polymer solution was cast on a polyimide film (Upilex 25S made by Ube Industries, Ltd.), solvent was volatilized by heating at 80° C. for 30 minutes followed by heating a 150° C. for one hour to produce a laminated sheet-shaped sample with coating thickness of about 20 μm formed on the polyimide film. This laminated sheet-shaped sample was cut out in 5 inches×0.5 inches to give a test piece, which was used for a combustion test. The evaluation of resistance to flame was performed in conformity with the UL 94 Standard Vertical Burning Test. That is to say, the test piece was held in a vertical direction by a clamp-equipped stand and the upper part of the test piece was fixed by the clamp so that the lower end of the test piece was in height of 12 inches (304.8 mm). In addition, cotton was placed below the sample to observe ignition in the event of flaming drips. After a burner flame adjusted to 0.75 inches (19.05 mm) was applied for 10 seconds (at the position of 1 inch (25.4 mm) in the lower part of the sample), the flame was withdrawn and combustion time of the sample was measured. Immediately after combustion ceased, flame was again applied for 10 seconds and combustion (red-hot) time was measured. The measurement was carried out by one set of n=5, and two sets were tested (total 10 samples). As the UL 94V-10 criteria, the following items were observed. Those fulfilling all these items were accepted.

(1) Combustion does not continue 10 second or longer after the first flame application.

(2) Combustion time is not longer than 50 second after flame application for 5 samples×twice (total 10 times).

(3) Cotton placed 12 inches below is not ignited by flaming drips.

(4) Red-hot combustion time is not longer than 30 second after the second flame application.

(5) Combustion does not go up to the part of the clamp.

The compounds used for each example below were as the following.

[Phosphorus Compound Having at Least Two Alcoholic Hydroxyl Groups]

PO-4500 (n-butyl-bis(3-hydroxypropyl)phosphine oxide made by Nippon Chemical Industrial Co., Ltd.)

[Polycarbonate Diol]

C-5090 (made by Kuraray Co. Ltd, average molecular weight 5,000, hydroxyl group index 22.6 mgKOH/g)

UH-CARB200N (made by Ube Industries, Ltd., average molecular weight 2,000, hydroxyl group index 56.0 mgKOH/g, product with not-inactivated catalyst)

UH-CARB50 (made by Ube Industries, Ltd., average molecular weight 500, hydroxyl group index 225 mgKOH/g)

[Carbonate Compound]

Diphenyl carbonate (made by Wako Pure Chemical Industries, Ltd.)

[Chain Extender]

2,2-bis(hydroxymethyl)propionic acid (made by Koei-Perstorp Co., Ltd.)

[Polyisocyanate Compound]

isophorone diisocyanate (made by Degussa AG)

4,4'-diphenylmethane diisocyanate (made by Nippon Polyurethane Industry Co., Ltd.)

[Organic Solvent]

γ-butyrolactone (made by Wako Pure Chemical Industries, Ltd.)

[Catalyst]

tetra-n-butoxy titanium (made by Wako Pure Chemical Industries, Ltd.)

dibutyltin laurate (made by Wako Pure Chemical Industries, Ltd.)

Example 1

Production of the Phosphorus-Containing Polycarbonate Diol (PCD 1)

175.0 g of C-5090 and 125.7 g of PO-4500 were added to 300 mL glass reactor equipped with a stirrer, thermometer and inlet tube of nitrogen, which were stirred at 100° C. for one hour to give solution. After the temperature was elevated to 180° C., 0.15 g of tetra-n-butoxy titanium was added, which was stirred for three hours to react. The phosphorus-containing polycarbonate diol (PCD 1) liquid at 20° C. with viscosity of 9.0 Pa·s, hydroxyl group index of 223 mgKOH/g (number average molecular weight of 503) was obtained.

FIG. 1 shows the GPC charts before the reaction and after the reaction. In the chart before the reaction (solid line), there are seen phosphorus diol (a) in the region of lower molecular weight and polycarbonate diol C-5090 (a'). On the other hand, only the resultant polymer (b) is seen in the chart after the reaction (broken line), and the consumption of phosphorus diol by the reaction is observed.

Figure 2:
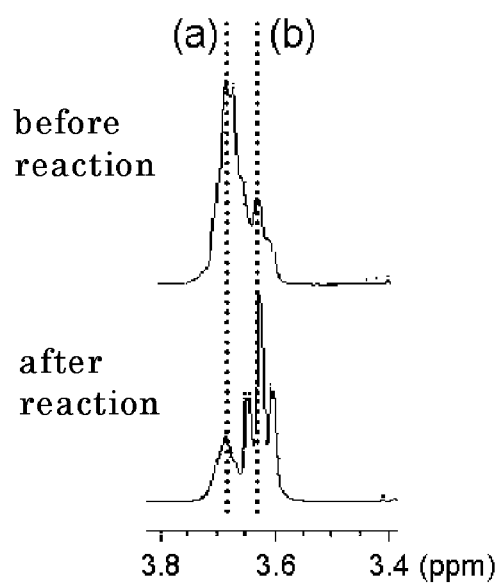
FIG. 2 shows a part of the $^1$H-NMR chart before and after the reaction in the Example 1 of the present invention.

FIG. 2 shows the $^1$H-NMR before the reaction and after the reaction. Since the methylene proton adjacent to the phosphorus diol hydroxyl group (a) decreases and the methylene proton adjacent to the polycarbonate diol hydroxyl group (b) increases after the reaction, it is appreciated that the phosphorus diol was incorporated into the main chain backbone of the polycarbonate. The phosphorus content in PCD 1 calculated from the fed amount was 5.8% by weight. When the $^1$H-NMR of the phosphorus-containing polycarbonate diol (PCD 1) was measured, the peaks assigned to a by-product were seen at 3.3 to 3.5 ppm. A MS spectrum revealed that this by-product was the cyclic ether material of the phosphorus diol with molecular weight of 204. It was observed by $^1$H-NMR that the cyclic ether by-product yielded in 0.6% by weight.

Example 2

Production of the Phosphorus-Containing Polycarbonate Diol (PCD 2)

40.0 g of UH-CARB200N and 13.3 g of PO-4500 were added to 300 mL glass reactor equipped with a stirrer, thermometer and inlet tube of nitrogen, which were stirred and reacted at 180° C. for three hours. The phosphorus-containing polycarbonate diol (PCD 2) liquid at 20° C. with viscosity of 42 Pa·s, hydroxyl group index of 98.3 mgKOH/g (number average molecular weight of 1,140) was obtained. The phosphorus content in PCD 2 calculated from the fed amount was 3.5% by weight. In addition, no by-product, the cyclic ether material of the phosphorus diol was observed by $^1$H-NMR.

Example 3

Production of the Phosphorus-Containing Polycarbonate Diol (PCD 3)

175.0 g of C-5090 and 125.7 g of PO-4500 were added to 300 mL glass reactor equipped with a stirrer, thermometer and inlet tube of nitrogen, which were stirred at 100° C. for one hour to give solution. After the temperature was elevated to 200° C., 0.15 g of tetra-n-butoxy titanium was added, which was stirred for three hours to react. The phosphorus-containing polycarbonate diol (PCD 3) liquid at 20° C. with viscosity of 2.1 Pa·s, hydroxyl group index of 274 mgKOH/g (number average molecular weight of 410) was obtained. The phosphorus content in PCD 3 calculated from the fed amount was 5.8% by weight. In addition, it was observed by $^1$H-NMR that the cyclic ether by-product yielded in 11%. It was seen that when the reaction temperature was 200° C., the production amount of the by-product, the cyclic ether material of the phosphorus diol tended to increase in comparison with the examples 1 and 2 wherein the reaction temperature was 180° C.

Example 4

Production of the Phosphorus-Containing Polycarbonate Diol (PCD 4)

150.1 g of C-5090 and 53.6 g of PO-4500 were added to 300 mL glass reactor equipped with a stirrer, thermometer and inlet tube of nitrogen, which were stirred at 100° C. for one hour to give solution. After the temperature was elevated to 160° C., 0.09 g of tetra-n-butoxy titanium was added, which was stirred for 14 hours to react. The phosphorus-containing polycarbonate diol (PCD 4) liquid at 20° C. with viscosity of 15.0 Pa·s, hydroxyl group index of 147 mgKOH/g (number average molecular weight of 763) was obtained. When $^1$H-NMR of this phosphorus-containing polycarbonate diol (PCD 4) was measured, no peak of the by-product, the cyclic ether material of the phosphorus diol was seen.

Example 5

Production of the Phosphorus-Containing Polycarbonate Diol (PCD 5)

24.18 g of PO-4500 and 20.45 g of diphenyl carbonate were added to 100 mL glass reactor equipped with a stirrer, thermometer and fractional distillation column, which were stirred in a nitrogen atmosphere at 130° C. for one hour. After that, the pressure was reduced to 0.3 kPa while the batch was gradually heated up to 150° C. to distill the resultant phenol. The phosphorus-containing polycarbonate diol (PCD 5) as viscous liquid at 20° C. with hydroxyl group index of 69.7 mgKOH/g (number average molecular weight of 1610) was obtained. The phosphorus content in PCD 5 calculated from the fed amount was 12.6% by weight. When $^1$H-NMR was measured, no peak of the by-product, the cyclic ether material of the phosphorus diol was seen.

Example 6

Production of the Phosphorus-Containing Polycarbonate Polyurethane (PU 1)

The phosphorus-containing polycarbonate diol (PCD 1) 50.0 g obtained in the example 1 and γ-butyrolactone 72.3 g were added to 300 mL glass reactor equipped with a stirrer, thermometer and inlet tube of nitrogen, which were stirred at room temperature. To the mixture, isophorone diisocyanate 22.9 g and dibutyltin laurate 0.056 g were added and reacted at 60° C. for two hours and further 90° C. for 12 hours to obtain the phosphorus-containing polycarbonate polyurethane (PU 1) solution with solid content of 50% and viscosity of 142 Pa·s. The phosphorus content in PU 1 calculated from the fed amount was 4.0% by weight. After the obtained solution was cast on a peeling-treated glass plate, solvent was volatilized by heating at 80° C. for 30 minutes followed by heating at 150° C. for one hour to prepare a sheet-shaped sample with thickness of about 100 μm. Table 1 shows the evaluations of the tensile properties (initial modulus, rupture strength and rupture elongation) and flame retardance (the UL test and oxygen index) for this sheet-shaped sample.

Example 7

Production of the Phosphorus-Containing Polycarbonate Polyurethane (PU 2)

The phosphorus-containing polycarbonate diol (PCD 2) 45.7 g obtained in the example 2,2,2-bis(hydroxymethyl) propionic acid 1.34 g and γ-butyrolactone 41.8 g were added to 300 mL glass reactor equipped with a stirrer, thermometer and inlet tube of nitrogen, which were stirred at room temperature. To the mixture, 4,4'-diphenylmethane diisocyanate 11.4 g were added and reacted at 60° C. for two hours and further 80° C. for 10 hours to obtain the phosphorus-containing polycarbonate polyurethane (PU 2) solution with solid content of 50% and viscosity of 22.0 Pa·s. The phosphorus content in PU 2 calculated from the fed amount was 2.6% by weight. A sheet-shaped sample was made by a method similar to the example 6. Table 1 shows the evaluations of the tensile properties and flame retardance.

Example 8

Production of the Phosphorus-Containing Polycarbonate Polyurethane (PU 3)

The phosphorus-containing polycarbonate diol (PCD 5) 16.10 g obtained in the example 5, 2,2-bis(hydroxymethyl) propionic acid 0.34 g and γ-butyrolactone 19.28 g were added to 100 mL glass reactor equipped with a stirrer, thermometer and inlet tube of nitrogen, which were stirred at room temperature. To the mixture, 4,4'-diphenylmethane diisocyanate 2.84 g were added and reacted at 60° C. for two hours and further 80° C. for 10 hours to obtain the phosphorus-containing polycarbonate polyurethane (PU 3) solution with solid content of 51% and viscosity of 14.6 Pa·s. The phosphorus content in PU 3 calculated from the fed amount was 10.5% by weight. A sheet-shaped sample was made by a method similar to the example 6. Table 1 shows the evaluations of the tensile properties and flame retardance.

Comparative Example 1

Production of the Polycarbonate Polyurethane (PU 4)

100.0 g of UH-CARB50 and 139.9 g of γ-butyrolactone were added to 300 mL glass reactor equipped with a stirrer, thermometer and inlet tube of nitrogen, which were stirred at room temperature. To the mixture, isophorone diisocyanate 40.5 g and dibutyltin laurate 0.058 g were added and reacted at 60° C. for two hours and further 90° C. for 10 hours to obtain the polycarbonate polyurethane (PU 4) solution with solid content of 50% and viscosity of 544 Pa·s. A sheet-shaped sample was made by a method similar to the example 6. Table 1 shows the evaluations of the tensile properties and flame retardance.

TABLE 1

|  | Tensile properties | | | Flame retardance | |
|---|---|---|---|---|---|
|  | Initial modulus (MPa) | Rupture strength (MPa) | Rupture elongation (MPa) | UL test UL94V | Oxygen index |
| example 6 | 337 | 12 | 140 | V-0 | 34.2 |
| example 7 | 39 | 7 | 370 | V-0 | 28.5 |
| example 8 | 124 | 8 | 150 | V-0 | 35.0 or higher |
| Comparative example 1 | 6.5 | 1 | 820 | NG | 21.9 |

According to the examples and comparative example, it became apparent that the phosphorus-containing polycarbonate polyols of the present invention are excellent in flame retardance and they can preferably used as the polyol component of polyurethanes like the conventional polycarbonate polyols.

INDUSTRIAL APPLICABILITY

The phosphorus-containing polycarbonate polyols of the present invention are useful as a reactive flame-retardant agent.

The invention claimed is:

1. A phosphorus-containing polycarbonate polyol, consisting essentially of:
   a structural unit (I) represented by a formula: —OCOO—,
   a structural unit (II) represented by a residue A, wherein A denotes an n-valent residue in which n of alcoholic hydroxyl groups are removed from a phosphorus compound having at least n of alcoholic hydroxyl groups, in which n is an integer of 2 or larger, wherein A is directly bonded to the structural unit (I) represented by a formula: —OCOO—; and
   optionally a structural unit B, wherein B denotes a di- or poly valent residue in which alcoholic hydroxyl groups are removed from a polyol, wherein B is directly bonded to the structural unit (I) represented by a formula: —OCOO—,
   wherein a terminal group of the polyol is an alcoholic hydroxyl group.

2. A phosphorus-containing polycarbonate polyol according to claim 1, comprising a structural unit represented by a general formula (1):

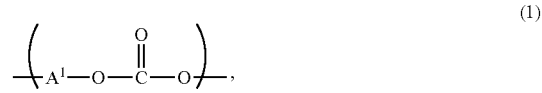

(1)

wherein $A^1$ in the formula (1) denotes a divalent residue in which two alcoholic hydroxyl groups are removed from a phosphorus compound having at least two alcoholic hydroxyl groups.

3. A phosphorus-containing polycarbonate polyol according to claim 1, having a number average molecular weight from 500 to 10,000.

4. A phosphorus-containing polycarbonate polyol according to claim 1, wherein A is represented by a general formula (2):

(2)

wherein $R_1$ in the formula (2) denotes a monovalent hydrocarbon group having 1 to 20 carbon atoms and $R_2$ denotes a divalent hydrocarbon group having 1 to 20 carbon atoms, in which both of said hydrocarbon groups may have a cyclic structure in their structures or may have a heteroatom.

5. A phosphorus-containing polycarbonate polyurethane, produced by reacting a phosphorus-containing polycarbonate polyol with a polyisocyanate, wherein the phosphorous-containing polycarbonate polyol consists essentially of:
   a structural unit (I) represented by a formula: —OCOO—,
   a structural unit (II) represented by a residue A, wherein A denotes an n-valent residue in which n of alcoholic hydroxyl groups are removed from a phosphorous compound having at least n of alcoholic hydroxyl groups, in which n is an integer of 2 or lamer, wherein A is directly bonded to the structural unit (I) represented by a formula: —OCOO—, and
   optionally a structural unit B, wherein B denotes a di- or poly valent residue in which alcoholic hydroxy groups are removed from a polyol, wherein B is directly bonded to the structural unit (I) represented by a formula: —OCOO—,
   wherein a terminal group of the alcoholic hydroxy group.

6. A phosphorus-containing polycarbonate polyurethane according to claim 5, wherein a content of phosphorus in the phosphorus-containing polycarbonate polyurethane is not less than 0.5% by weight.

7. A phosphorus-containing polycarbonate polyurethane according to claim 5, having an oxygen index of not less than 22.

8. A method for producing the phosphorus-containing polycarbonate polyol according to claim 1, comprising reacting a polycarbonate polyol with a phosphorus compound having at least two alcoholic hydroxyl groups.

9. A method for producing the phosphorus-containing polycarbonate polyol according to claim 8, wherein a reaction temperature is from 100° C. to 180° C.

10. A method for producing the phosphorus-containing polycarbonate polyol according to claim 1, comprising reacting a carbonate compound with a phosphorus compound having at least two alcoholic hydroxyl groups in the presence of a catalyst.

11. A method according to claim 10 for producing the phosphorus-containing polycarbonate polyol, wherein a reaction temperature is from 80° C. to 250° C.

* * * * *

UNITED STATES PATENT AND TRADEMARK OFFICE
CERTIFICATE OF CORRECTION

| | |
|---|---|
| PATENT NO. | : 8,344,096 B2 |
| APPLICATION NO. | : 12/667607 |
| DATED | : January 1, 2013 |
| INVENTOR(S) | : Ryoichi Takasawa et al. |

It is certified that error appears in the above-identified patent and that said Letters Patent is hereby corrected as shown below:

In the Specifications:

In Column 9, Line 41, Change "hexandiol;" to --hexanediol;--.

In Column 9, Line 43, Change "hexandiol" to --hexanediol--.

In Column 9, Line 43, Change "hexandiol;" to --hexanediol;--.

In Column 9, Lines 44-45, Change "heptandiol;" to --heptanediol;--.

In Column 11, Line 17, Change "hexandiol," to --hexanediol,--.

In the Claims:

In Column 18, Line 48, In Claim 5, change "phosphorous" to --phosphorus--.

In Column 18, Line 50, In Claim 5, change "—OCOO—," to -- —OCOO—;--.

In Column 18, Line 53, In Claim 5, change "phosphorous" to --phosphorus--.

In Column 18, Line 55, In Claim 5, change "lamer," to --larger,--.

In Column 18, Line 57, In Claim 5, change "—OCOO—," to -- —OCOO—;--.

In Column 18, Line 63, In Claim 5, after "the" insert --polyol is an--.

Signed and Sealed this
Third Day of September, 2013

Teresa Stanek Rea
*Acting Director of the United States Patent and Trademark Office*